United States Patent
Lyne et al.

(10) Patent No.: US 9,312,923 B2
(45) Date of Patent: *Apr. 12, 2016

(54) PERSONAL POINT OF SALE

(71) Applicant: Cubic Corporation, San Diego, CA (US)

(72) Inventors: Malcolm Lyne, San Diego, CA (US); David deKozan, San Diego, CA (US); Kay Paetzold, Hamburg (DE)

(73) Assignee: Cubic Corporation, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/733,607

(22) Filed: Jun. 8, 2015

(65) Prior Publication Data
US 2015/0270873 A1 Sep. 24, 2015

Related U.S. Application Data

(63) Continuation of application No. 13/627,079, filed on Sep. 26, 2012, now Pat. No. 9,083,486.

(60) Provisional application No. 61/539,345, filed on Sep. 26, 2011.

(51) Int. Cl.
*H04L 29/06* (2006.01)
*H04B 5/00* (2006.01)
(Continued)

(52) U.S. Cl.
CPC .............. *H04B 5/0031* (2013.01); *G06Q 20/20* (2013.01); *G06Q 20/3227* (2013.01); *G06Q 20/3278* (2013.01); *G06Q 20/354* (2013.01); *G06Q 20/382* (2013.01); *G07F 7/088* (2013.01);
(Continued)

(58) Field of Classification Search
CPC .................... H04L 2209/805; H04L 63/0492; H04L 9/00; H04L 9/0866; H04L 9/0877
See application file for complete search history.

(56) References Cited

U.S. PATENT DOCUMENTS

| 4,798,322 A | 1/1989 | Bernstein et al. |
| 5,295,188 A | 3/1994 | Wilson et al. |

(Continued)

FOREIGN PATENT DOCUMENTS

| EP | 690399 A2 | 1/1996 |
| EP | 758777 A2 | 2/1997 |

(Continued)

OTHER PUBLICATIONS

U.S. Appl. No. 09/360,068, filed Jul. 23, 1999, Non-Final Office Action mailed on Mar. 15, 2004, 9 pages.

(Continued)

*Primary Examiner* — Chau Le
(74) *Attorney, Agent, or Firm* — Kilpatrick Townsend & Stockton LLP

(57) ABSTRACT

Embodiments provided herein include techniques for enabling a mobile device to communicate with smart media in a manner that can sidestep the secure element of the mobile device—and the costs associated with it. The mobile device can communicate with the smart media using near-field communication (NFC) by creating an encrypted connection with a remote computer while bypassing a secure element of the mobile device. This allows the mobile device to provide point-of-sale (POS) functionality by reading and/or writing to the smart media, without compromising the security of the smart media.

15 Claims, 5 Drawing Sheets

(51) Int. Cl.

| | | |
|---|---|---|
| *H04L 9/00* | (2006.01) | |
| *H04W 12/00* | (2009.01) | |
| *H04L 9/08* | (2006.01) | |
| *H04W 12/02* | (2009.01) | |
| *H04M 1/725* | (2006.01) | |
| *G06Q 20/20* | (2012.01) | |
| *G06Q 20/32* | (2012.01) | |
| *G06Q 20/34* | (2012.01) | |
| *G06Q 20/38* | (2012.01) | |
| *G07F 7/08* | (2006.01) | |
| *H04W 76/02* | (2009.01) | |
| *H04W 4/00* | (2009.01) | |
| *H04M 1/675* | (2006.01) | |

(52) U.S. Cl.
CPC ............... *G07F 7/0886* (2013.01); *H04L 9/00* (2013.01); *H04L 9/0866* (2013.01); *H04L 9/0877* (2013.01); *H04M 1/7253* (2013.01); *H04W 12/00* (2013.01); *H04W 12/02* (2013.01); *H04W 76/022* (2013.01); *H04W 76/023* (2013.01); *H04L 63/0492* (2013.01); *H04L 2209/805* (2013.01); *H04M 1/675* (2013.01); *H04M 2250/04* (2013.01); *H04W 4/008* (2013.01)

(56) References Cited

U.S. PATENT DOCUMENTS

| | | |
|---|---|---|
| 5,347,580 A | 9/1994 | Molva et al. |
| 5,414,772 A | 5/1995 | Naccache et al. |
| 5,530,232 A | 6/1996 | Taylor |
| 5,544,246 A | 8/1996 | Mandelbaum et al. |
| 5,546,463 A | 8/1996 | Caputo et al. |
| 5,623,637 A | 4/1997 | Jones et al. |
| 5,664,157 A | 9/1997 | Takahira et al. |
| 5,677,955 A | 10/1997 | Doggett et al. |
| 5,714,741 A | 2/1998 | Pieterse et al. |
| 5,727,230 A | 3/1998 | Fujioka |
| 5,729,594 A | 3/1998 | Klingman |
| 5,745,571 A | 4/1998 | Zuk |
| 5,778,071 A | 7/1998 | Caputo et al. |
| 5,847,447 A | 12/1998 | Rozin et al. |
| 5,878,142 A | 3/1999 | Caputo et al. |
| 6,101,477 A | 8/2000 | Hohle et al. |
| 6,226,744 B1 | 5/2001 | Murphy et al. |
| 6,304,223 B1 | 10/2001 | Hilton et al. |
| 7,437,560 B1 | 10/2008 | Page et al. |
| 7,562,818 B1* | 7/2009 | Bierbaum et al. ............. 235/384 |
| 8,181,867 B1* | 5/2012 | Bierbaum et al. ............. 235/384 |
| 8,929,805 B2* | 1/2015 | Yu et al. ........................ 455/41.1 |
| 9,083,486 B2 | 7/2015 | Lyne et al. |
| 2004/0059908 A1 | 3/2004 | Yamada et al. |
| 2004/0072592 A1* | 4/2004 | Hasegawa ..................... 455/558 |
| 2005/0197859 A1 | 9/2005 | Wilson et al. |
| 2006/0102717 A1 | 5/2006 | Wood et al. |
| 2006/0149962 A1 | 7/2006 | Fountain et al. |
| 2008/0052233 A1* | 2/2008 | Fisher et al. ..................... 705/40 |
| 2008/0116264 A1* | 5/2008 | Hammad et al. ............... 235/382 |
| 2009/0193500 A1* | 7/2009 | Griffin et al. ..................... 726/2 |
| 2009/0265776 A1 | 10/2009 | Baentsch et al. |
| 2010/0007466 A1 | 1/2010 | Shoarinejad Kambiz et al. |
| 2010/0293382 A1* | 11/2010 | Hammad ..................... 713/173 |
| 2010/0327054 A1* | 12/2010 | Hammad ..................... 235/375 |
| 2011/0191244 A1* | 8/2011 | Dai ................................ 705/44 |
| 2013/0086375 A1 | 4/2013 | Lyne et al. |
| 2014/0095227 A1* | 4/2014 | Parker et al. ..................... 705/5 |

FOREIGN PATENT DOCUMENTS

| | | |
|---|---|---|
| EP | 924667 A2 | 6/1999 |
| EP | 2106191 A2 | 9/2009 |
| WO | 91/14237 A1 | 9/1991 |
| WO | 95/30975 A1 | 11/1995 |
| WO | 97/10562 A1 | 3/1997 |
| WO | 98/52151 A1 | 11/1998 |
| WO | 01/08110 A1 | 2/2001 |
| WO | 2004/019282 A1 | 3/2004 |
| WO | 2009/082748 A1 | 7/2009 |

OTHER PUBLICATIONS

U.S. Appl. No. 09/360,068, filed Jul. 23, 1999, Non-Final Office Action mailed on Jan. 25, 2005, 11 pages.
U.S. Appl. No. 09/360,068, filed Jul. 23, 1999, Non-Final Office Action mailed on Jul. 13, 2005, 11 pages.
U.S. Appl. No. 09/360,068, filed Jul. 23, 1999, Non-Final Office Action mailed on Feb. 9, 2006, 11 pages.
U.S. Appl. No. 09/360,068, filed Jul. 23, 1999, Final Office Action mailed on Aug. 10, 2006, 13 pages.
U.S. Appl. No. 09/360,068, filed Jul. 23, 1999, Non-Final Office Action mailed Dec. 29, 2006, 14 pages.
U.S. Appl. No. 09/360,068, filed Jul. 23, 1999, Non-Final Office Action mailed Aug. 7, 2007, 16 pages.
U.S. Appl. No. 09/360,068, filed Jul. 23, 1999, Final Office Action mailed on Feb. 20, 2008, 17 pages.
PCT International Search Report and Written Opinion of PCT/US2013/050340 mailed on Oct. 31, 2013.
International Preliminary Report on Patentability mailed on Jan. 22, 2015 for PCT/US2013/050340.
PCT International Search Report and Written Opinion of PCT/US2012/057345 mailed on Sep. 26, 2012.
U.S. Appl. No. 13/627,079, filed Sep. 26, 2012, Non-Final Office Action mailed Mar. 4, 2014, all pages.
U.S. Appl. No. 13/627,079, filed Sep. 26, 2012, Final Office Action mailed Nov. 26, 2014, all pages.
U.S. Appl. No. 13/940,455, filed Jul. 12, 2013 Non Final Office Action mailed Jul. 14, 2015, all pages.

* cited by examiner

PERSONAL POINT OF SALE

CROSS-REFERENCE TO RELATED APPLICATION

The present application is a continuation of Ser. No. 13/627,079, filed Sep. 26, 2012, entitled "PERSONAL POINT OF SALE", which claims benefit under 35 USC 119(e) of 61/539,345, filed Sep. 26, 2011, entitled "MOBILE PHONE SECURE TOP UP", the entire contents of which are incorporated by reference herein for all purposes.

BACKGROUND

Many mobile devices are natively equipped to communicate using Near-Field Communication (NFC). Other mobile devices may become NFC-enabled with the use of accessories, such as a sleeve, dongle, and the like. Such NFC-enabled mobile devices may further come with a secure element with which the mobile device may utilize encrypted communications, enabling the mobile device to read smart cards, radio-frequency identification (RFID) tags, and other smart media, and/or replace them altogether.

The use of the secure element in this manner, however, typically is not free. There can be costs related to encrypted channels, licensed technologies, and other features of the secure element. These costs can ultimately prevent a user from utilizing the NFC functionality of a mobile device that takes advantage of the secure element in this manner.

BRIEF SUMMARY

Embodiments provided herein include techniques for enabling a mobile device to communicate with a smart media in a manner that can sidestep the secure element of the mobile device—and the costs associated with it. The mobile device can communicate with the smart media using near-field communication (NFC) by creating an encrypted connection with a remote computer while bypassing a secure element of the mobile device. This allows the mobile device to provide point-of-sale (POS) functionality by reading and writing to the smart media, without compromising the security of the smart media.

An example method for enabling a mobile device to communicate with a smart media, according to the disclosure, includes providing a user interface with the mobile device where the user interface operable to receive user input, receiving, with the mobile device, the user input, and reading information from the smart media with the mobile device. The method also includes establishing a secure communications link between the mobile device and a remote computer. Establishing the secure communications link can include providing at least a portion of the information from the smart media. The method further includes receiving encrypted data from the remote computer via the secure communications link, and communicating the encrypted data to the smart media.

The example method for enabling the mobile device to communicate with the smart media can also include one or more of the following features. Communicating the encrypted data to the smart media can include writing the encrypted data without using a secure element of the mobile device. Communicating the encrypted data to the smart media can include communicating with the smart media wirelessly using Near-Field Communications (NFC). Reading the information from the smart media can be based on the user input. The smart media can include at least one of a contactless smart card, a credit card, a debit card, or a radio-frequency identification (RFID) tag. The smart media can be physically attached to the mobile device. The smart media can be adhesively coupled with the mobile device. Communicating the encrypted data to the smart media can include changing a value stored in a memory of the smart media. The value can be used to track usage related to a transit system. Providing the at least a portion of the information from the smart media can include providing an identifier of the smart media. The user input can include at least one of login information, payment source information, payment amount information, or an indication of a product or service for purchase.

An example non-transitory computer-readable medium having instructions embedded thereon enabling a mobile device to communicate with a smart media, according to the disclosure, can include instructions with computer-executable code for providing a user interface with the mobile device where the user interface is operable to receive user input, receiving the user input, reading information from the smart media, and establishing a secure communications link between the mobile device and a remote computer. Establishing the secure communications link can include providing at least a portion of the information from the smart media. The instructions can also include computer-executable code for receiving encrypted data from the remote computer, and communicating the encrypted data to the smart media.

The example non-transitory computer-readable medium can also include one or more of the following features. Code for communicating the encrypted data to the smart media can include code for writing the encrypted data without using a secure element of the mobile device. The smart media can comprise at least one of a contactless smart card, a credit card, a debit card, or a radio-frequency identification (RFID) tag. The computer-executable code for providing the user interface can include computer-executable code for displaying a graphical user interface on a display of the mobile device. Providing the at least a portion of the information from the smart media can include providing an identifier of the smart media. The computer-executable code for receiving the user input can include computer-executable code for receiving at least one of login information, payment source information, payment amount information, or a product or service for purchase.

Another example method for enabling a mobile device to communicate with a smart media, according to the disclosure, can include receiving, from a mobile device, identifying information regarding the smart media, determining, with a computer, an encryption key based on the identifying information, and establishing a secure communications link between the computer and a mobile device. The secure communications link can be established, based on at least a portion of information read from the smart media by the mobile device. The method can also include communicating encrypted data to the mobile device, via the secure communications link, to be written on the smart media.

The example method for enabling the mobile device to communicate with the smart media can include one or more of the following features. Determining the encryption key can include communicating with an external encryption engine. Encrypted data can include a value used to track usage related to a transit system. The encrypted data can include an indication that a ticket related to the smart media is no longer valid. The method can further include receiving, from the mobile device at least one of login information, payment source information, payment amount information, or an indication of a product or service for purchase. The method can also include identifying a user account related to either or both of the smart media or the mobile device.

Numerous benefits are achieved over conventional techniques. For example, a user can update smart media using a personal mobile device, without the need to visit a specialized terminal or user services counter. By bypassing the secure element and utilizing smart media, techniques disclosed can help users avoid costs associated with the secure element. Moreover, certain smart media, such as stickers, can be coupled directly to the mobile device, providing essentially the same functionality as the secure element, without incurring the costs. Allowing individual users to reload their own smart media also allows a distributor or transit agency to reduce the cost of maintaining its own distribution network. These and other embodiments, along with many of its advantages and features, are described in more detail in conjunction with the text below and attached figures.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1A:
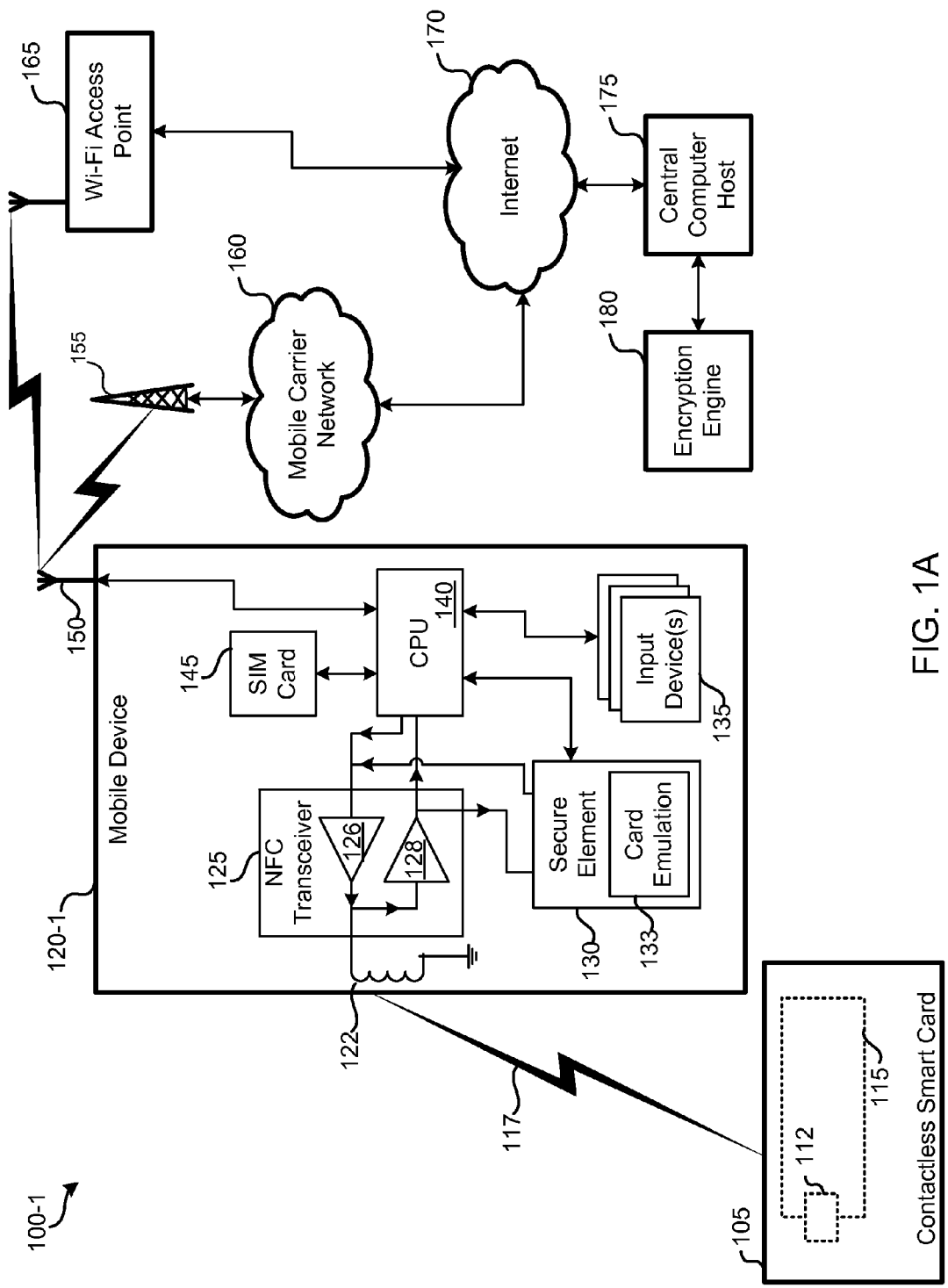
FIGS. 1A and 1B are simplified hardware block diagrams of embodiments of a system for enabling a mobile device to communicate with smart media.

For the purposes of explanation, the ensuing numerous provides specific details are set forth in order to provide a thorough understanding of various embodiments. It will be apparent, however, to one skilled in the art that various embodiments may be practiced without some of these specific details. For example, circuits, systems, networks, processes, and other components may be shown as components in block diagram form in order not to obscure the embodiments in unnecessary detail. In other instances, known circuits, processes, algorithms, structures, and techniques may be shown without unnecessary detail in order to avoid obscuring the embodiments. In other instances, well-known structures and devices are shown in block diagram form.

Embodiments provided herein include techniques for enabling a mobile device such as mobile phones, smart phones, tablet computers, personal media players, laptop computers, and other portable electronic devices, to securely communicate with smart media including, but not limited to, smart cards radio-frequency identification (RFID) tags, credit cards, debit cards, tickets, and the like. The smart media—in any physical form (card, ticket, RFID, etc.)—can include a memory with information such as a unique identifier (e.g., card number, serial number, etc.) and/or other information such as an electronic purse (cash), one or more products (e.g., passes), an origin and/or destination, validity parameters, and/or individual tickets, depending on the application in which the smart media is used (transit, transportation, event ticketing, etc.). The mobile device can communicate with the smart media using near-field communication (NFC) by creating an encrypted connection with a remote computer while bypassing a secure element of the mobile device. This allows the mobile device to read and write to the smart media using standard protocols (e.g., ISO 14443) and Internet connectivity via standard networks (e.g. Wi-Fi 802.11, 3G, 4G, and the like), without compromising the security of the smart media.

In some embodiments, the ability to read and/or write to smart media can include formatting and/or initializing the smart media. For example, using the techniques described herein below to read and/or write to the smart media, a mobile device may be utilized to initialize a smart media for use. In so doing, the smart media may be formatted, and encryption keys may be written to the smart media. Such functionality can facilitate the distribution of such smart media because the smart media would not have to be pre-encoded prior to delivery. Moreover, such encoding could help ensure the smart media receives the most recent formatting and/or security key(s).

Because techniques provided herein enable a mobile device to read from and write to smart media, the mobile device to function as a personal point-of-sale (POS) device to a user. The POS device can conduct point-of-sale transactions such as the sale of a product or service, ticket validation (e.g., debit a value from the smart media and/or cancel a ticket), and the like. For example, a user may use the mobile device to both purchase a product and update the smart media accordingly to reflect the purchase.

FIG. 1A is a simplified hardware block diagram of a first embodiment 100-1 of a system for enabling a mobile device 120-1 to communicate with the smart media. In this embodiment, the mobile device 120-1 utilizes native NFC capabilities to read and write to a contactless smart card 105 (or other smart media). It will be understood that the first embodiment 100-1 is provided as an example. Other embodiments of an IC 100 may include more, less, and/or different components, depending on desired functionality.

In this first embodiment 100-1, the mobile device 120-1 can include an NFC transceiver with modulation 126 and demodulation 128 circuitry enabling the mobile device 120-1 to establish a contactless communication link 117 with a contactless smart card 105 via an NFC antenna 122. The contactless smart card 105 (and/or other smart media) can include an antenna loop 115 and circuitry 112 to store information and communicate via contactless communication link 117. In some embodiments, the contactless smart card 105 and/or other smart media can communicate using ISO 14443 standards, and may be induction and/or battery powered.

The mobile device 120-1 also can include a secure element 130. In certain applications, the secure element 130 can be utilized to emulate cards, RFID tags, and/or other smart media with card emulation 133, communicating information via the NFC transceiver 125. The secure element 130 can offer encrypted communications and secure channels to help keep sensitive information (e.g., credit card and/or other account information, personal data, etc.) from being compromised. However, as indicated above, it can cost a user to utilize the secure element in this manner. Thus, embodiments can bypass the secure element 130 to allow a user to use a contactless smart card 105 (and/or other smart media) and avoid the costs associated with the secure element 130. As described in more detail below, communication with the smart media can still be encrypted by, for example, a central computer host 175, in which case the mobile device 120-1 can simply relay encrypted information between the contactless smart card 105 and the central computer host 175. That said, some embodiments may utilize the secure element 130.

In this first embodiment 100-1, the mobile device 120-1 includes other components, such as a central processing unit (CPU) 140, input device(s) 135, and subscriber identity module (SIM) card 145. Among other things, the SIM card 145 can be used to identify the mobile device 120-1 and/or a related user to the central computer host 175. Input device(s) 135 can be utilized to enable a user to provide input in any of a variety of ways. For example, the input device(s) 135 can include a touch screen, button(s), microphone, camera, and the like. In some embodiments, depending on the model of the mobile device 120-1 and mobile carrier network 160, the secure element 130 may be present as either embedded in the mobile phone hardware and/or firmware, embedded in the subscriber identity module (SIM) card 145, and/or included in a separate form factor, such as micro SD card.

The CPU 140 can be used to process information and coordinate the functionality of the various components of the mobile device 120-1. The CPU 140 can include one or more general-purpose processors and/or one or more special-purpose processors (such as digital signal processing chips, graphics acceleration processors, microprocessors, and/or the like). The CPU may be configured to execute one or more computer programs stored, for example, on a computer-readable storage medium (not shown), or memory, such as a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like. Moreover, the computer-readable storage medium can be removable, incorporated into the mobile device 120-1, and/or communicatively coupled with the mobile device 120-1 via a communication interface.

The mobile device 120-1 can communicate with one or more communication networks via one or more antenna(s) 150. Such communication networks can include a mobile carrier network (e.g., cell phone service via cell phone tower 155), the Internet 170 (via Wi-Fi access point 165), and/or other networks. In the first embodiment 100-1 of FIG. 1A, the mobile device is able to gain access to the Internet 170 via either or both of a Wi-Fi access point 165 or a mobile carrier network 160. The Internet 170, in turn, provides the mobile device 120-1 access to the central computer host 175. In other embodiments, other forms of wireless and/or wired communication can be utilized, depending on desired functionality.

The central computer host 175 can comprise one or more computers configured to manage and/or update smart media, such as the contactless smart card 105. To this end, it can manage and/or access one or more encryption key(s) associated with each smart media. In some embodiments, such as the first embodiment 100-1 of FIG. 1A, encryption keys may be stored externally in an encryption engine 180 such as a separate computer and/or a specialized encryption hardware.

In this first embodiment 100-1, the contactless smart card 105 can be written to as follows. A user may bring contactless smart card 105 within a range of the mobile device 120-1 sufficient to activate the contactless smart card 105 and start an initial communication between the mobile device 120-1 and the contactless smart card 105. The user may activate a software application executed by the mobile device 120-1 before doing so. The software application can, for example, enable a user to perform various point-of-sale transactions such as load value to the electronic purse, purchase a product and/or validate a ticket, deliver an electronic benefit (e.g., debit a card and/or inactivate or cancel a ticket, inactivate and/or cancel the card, deliver a monthly employer transit benefit, etc.), in which data of the contactless smart card 105 is to be updated accordingly. In some embodiments, the software application can perform functions that do not necessarily result in updating a value on the card. For example, the software application can perform enforcement actions in which a value and/or other information is read from a card to ensure fare compliance. To complete a transaction involving reading and/or writing to the contactless smart card 105, the software application can prompt the user to bring contactless smart card 105 within a range of the mobile device 120-1 (e.g., tap the contactless smart card 105 to the mobile device 120-1).

During the initial communication, the mobile device 120-1 can read certain unsecure information from the contactless smart card 105, such as a serial, card, and/or account number; a name of a user associated with the contactless smart card 105; and the like. The mobile device 120-1 then can connect with the central computer host 175 via the Internet 170, using a data connection provided by the mobile carrier network 160, Wi-Fi access point 165, and/or another communication means with the Internet. In some embodiments, the user may input identifying information (e.g., login ID, password, etc.) using input device(s) 135, which can be used to establish an authenticated connection with the central computer host 175.

Using the serial number and/or other information provided by the mobile device 120-1, the central computer host can then establish a secure communications link with the mobile device. Information communicated via the secure communications link can be encrypted using one or more encryption keys associated with the contactless smart card 105. The encryption may take place in the central computer host using locally stored keys 175 and/or take place in the external encryption engine 180.

The encrypted information from the central computer host 175 can be sent to the contactless smart card 105 and used to update secure information of the contactless smart card 105. The mobile device 120-1 may not have encryption keys to decrypt the encrypted information. Instead the mobile device 120-1 can write to the contactless smart card by transparently passing the encrypted information along to the contactless smart card, bypassing the secure element 130 and simply modulating the encrypted information with the NFC transceiver 125 in accordance with related NFC protocols. The contactless smart card 105 can then update secure information stored in memory using the encrypted information. The contactless smart card 105 can then communicate to the mobile device 120-1 and/or central computer host 175 using encrypted and/or non-encrypted data to indicate whether the memory has been successfully (or unsuccessfully) updated.

Figure 1B:
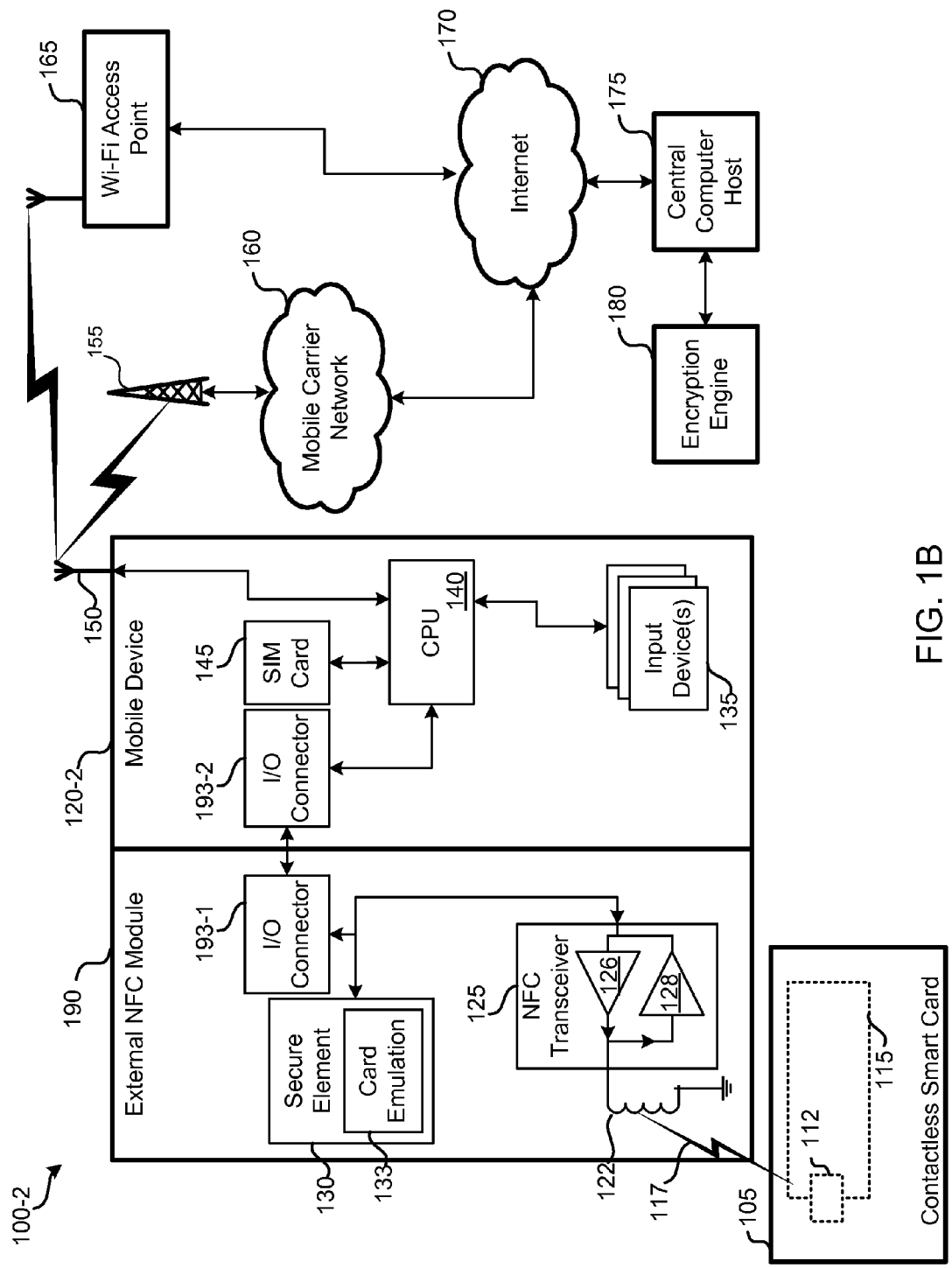

FIG. 1B is a simplified hardware block diagram of a second embodiment 100-2 of a system for enabling a mobile device 120-1 to communicate with the smart media. The second embodiment 100-2 of FIG. 1B is similar to the first embodiment 100-1 of FIG. 1A. Here, however, a second mobile device 120-2 without native NFC capability is used. Instead, the mobile device 120-2 is given NFC capabilities by an external NFC module 190, such as a mobile device sleeve or dongle, which includes some or all of the NFC-related components.

The mobile device 120-2 and external NFC module 190 can be communicatively coupled using respective input/output (I/O) connectors 193. The mobile device's I/O connector 193-2 can include a generic or specialized interface, such as a serial port, mini universal serial port (USB), parallel port, and the like, and the external NFC module's I/O connector 193-1 can include a port configured to communicate with the mobile device's I/O connector 193-2.

It will be understood that the embodiments provided in FIGS. 1A and 1B, as well as other embodiments detailed herein, are provided as non-limiting examples, that may not include every component for each embodiment. The external NFC module, for example, may include a processing unit, memory, and/or other subcomponents. The contactless smart card 105 can be replaced with any of a variety of smart media, including credit and/or debit cards, RFID tags, and the like. Moreover, the smart media may be physically attached to the mobile device 120 and/or external NFC module 190 (e.g., as a sticker or other item adhesively coupled to the mobile device). The central computer host 175 and/or encryption engine 180 may be a cloud-based and/or networked system of computers. Embodiments may also include using card emulation 133 in addition or as an alternative to smart media, and/or the user of an external card reader in addition or as an alternative to the external NFC module 190. A person of ordinary skill in the art will recognize many additions, substitutions, and other variations.

Figure 2:
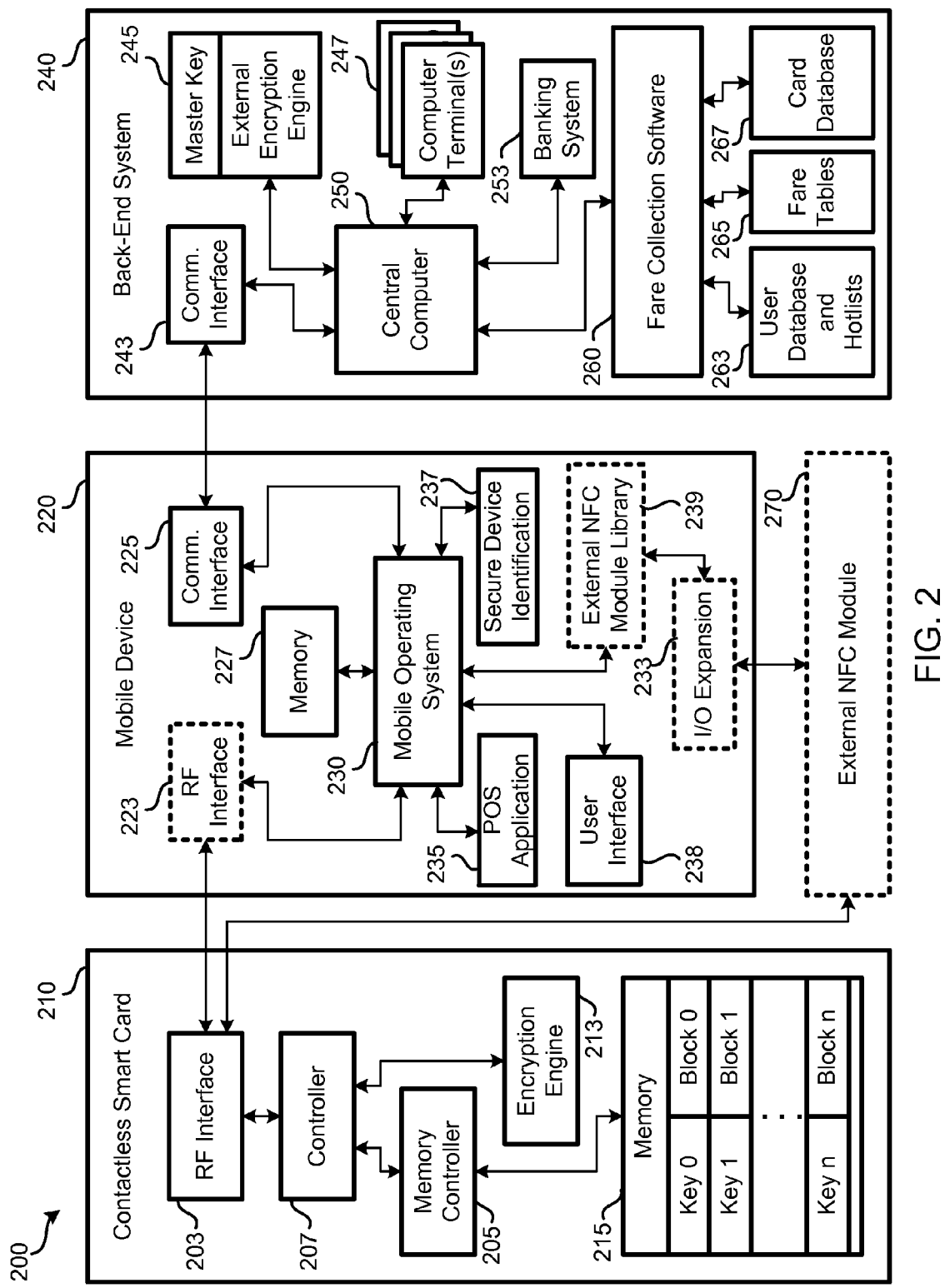
FIG. 2 is a simplified software block diagram a system for enabling a mobile device to communicate with the smart media, according to one embodiment in a transit system context.

FIG. 2 is a simplified software block diagram a system 200 for enabling a mobile device to communicate with the smart media, according to one embodiment in a transit system context. That said, the components depicted in FIG. 2 may be implemented in a variety of combinations of hardware and software, some of which (such as the contactless smart card 210, mobile device 220, and central computer 250) may correspond with components depicted in FIG. 1A and/or 1B. As with other figures provided herein, the system 200 shown in FIG. 2 is provided as a non-limiting example.

In this system 200, the contactless smart card 210 can include an RF interface 203, controller 207, memory controller 205 memory 215, and encryption engine 213. The encryption engine 213 can store, generate, and/or manage one or more encryption key(s) to help ensure sensitive information stored in memory 215 is not communicated via the RF interface 203 without proper encryption. The memory can store information such as a value, counter, product, and the like, that may be used in one or more of a variety of applications, such as transit fare, event ticketing, payment systems, etc. Different blocks of memory may be encrypted with different keys and have different access conditions. Furthermore, components of the contactless smart card 210 can further ensure that only authorized entities are provided read and/or write access to memory 215.

Mobile device 220 can include memory 227, communication interface 225, point-of-sale (POS) application 235, secure device identification 237, and user interface 238, each of which can communicate with, be integrated into, and/or be managed by mobile operating system (OS) 230. In some embodiments, such as those in which an external NFC module 270 is not utilized, the mobile device can include an RF interface 223. The mobile OS 230 and/or other applications can be stored in memory 227 and executed by the mobile device, for example, upon device startup or upon receiving certain user input and/or detecting other triggering events.

The POS application 235 can be an application executed by the mobile device 220 with which the user may initiate various point-of-sale functions related to the contactless smart card 210. In a transit context, for example, such functions can include purchasing a new product or service (e.g., a 20-ride pass, month-long pass, etc.) and/or validating a ticket (e.g., debiting a card and canceling a ticket). The POS application 235 can be evoked by user input (e.g., pressing a link of a user interface 238 shown on a touchscreen display of the mobile device 220) and/or when the mobile device 220 detects the contactless smart card 210. The POS application 235 also can receive input, such as a login ID, password, and/or other identifier, to send to a central computer 250, which may be used to identify a user and/or establish a secure connection between the mobile device 220 and the central computer 250.

The operation of POS application 235 may vary, depending on desired functionality. For example, a user may execute the POS application 235 on a personal mobile device 220 to initiate point-of-sale functions related to a contactless smart card 210. Additionally or alternatively, the POS application 235 may be used by an agent and/or vender to initiate point-of-sale functions related to the contactless smart card 210 of a customer. In either case, and in other scenarios, the secure device identification 237 (which can be related to a SIM card 145 of FIGS. 1A and 1B) can identify the mobile device 220 to the back-end system 240 for tracking and/or login purposes. In some embodiments, the POS application 235 can be a client program that communicatively connects with a server program executed by the central computer 250. In some embodiments, the POS application may be a browser-based program that enables users to initiate point-of-sale functions via a web portal.

The RF interface 223 of the mobile device 220 can include an NFC transceiver and/or antenna that enables the mobile device 220 to communicate with the contactless smart card 210. Additionally or alternatively, as shown in FIG. 1B, NFC and/or other wireless functionality may be provided by an external NFC module 270. In embodiments in which an external NFC module 270 is utilized, the mobile device 220 can include an external NFC module library 239, enabling the mobile operating system 230 to communicate with and/or manage any of a variety of external NFC modules 270, which can be manufactured by third parties. The external NFC module library 239 can communicate with the external NFC module via an I/O expansion module 233 of the mobile device 220.

In addition to the central computer 250, the back-end system 240 can include a variety of additional components, depending on desired functionality. Components can include an external encryption engine 245 (which may have a master key, as indicated), one or more terminal computer(s) 247, connection to a banking system 253, and fare collection software 260 that communicates with a user database and hotlists 263, fare tables 265, and/or card database 267. Terminal computer(s) 247 can be any of a variety of machines or devices (computers, vending machines, etc.) that can provide point-of-sale and/or other functionality related to the transit system. As discussed earlier, components shown in FIG. 2 may be utilized in a transit system, but components may vary depending on application. A person having ordinary skill in the art will recognize many substitutions, alterations, and variations.

The mobile device 220 can communicate with the back-end system 240 via respective communication interfaces 225 and 243. As indicated previously, the central computer 250 can utilize information from the mobile device 220 to identify the mobile device 220 and/or a user associated with the mobile device 220. For example, a transit system may be an account-based system in which users can create accounts that are maintained by fare collection software 260 and stored in the user database and hotlists 263. An account-based system can enable the transit system to store payment information (e.g., credit card information, bank account, transit benefit account) associated with a user in the card database 267 and/or user database and hotlists 263. In this manner, the mobile device 220 may not need to communicate payment information to the central computer 250. Rather, the central computer 250 can use payment information stored in the card database 267 and associated with a user in the user database and hotlists 263 and/or user database and hotlists 263 to pay for a product or service requested by a user using the mobile device 220.

The back-end system can process payments by utilizing a connection to a banking system 253. Payments may be processed periodically in batches, or may be processed in real- or near-real time. Moreover, the central computer 250 can communicate information to the mobile device 220 indicating whether a payment was successfully made. Depending on the product or service requested by a user via the mobile device 220, the central computer 250 can gather information from the fare tables 265 (e.g., to calculate a fare) and/or card database (e.g., to verify and/or authenticate a contactless smart card) via the fare collection software 260 to calculate an amount of payment and/or a value to add, deduct, or write to the contactless smart card 210.

What is written to the contactless smart card 210 can vary, depending on desired functionality. For example, in addition or as an alternative to the account-based system described above, the system can provide for writing one or more secure token(s) to the contactless smart card 210 (or other smart media) without requiring the need for separate fare payment. With regards to bank cards, such as credit and/or debit cards, this information may be written to a scratch pad (i.e., unused portion of memory) of the bank card, thereby enabling the bank card to be utilized as a fare token, ticket, and/or other media, depending on the application.

Figure 3:
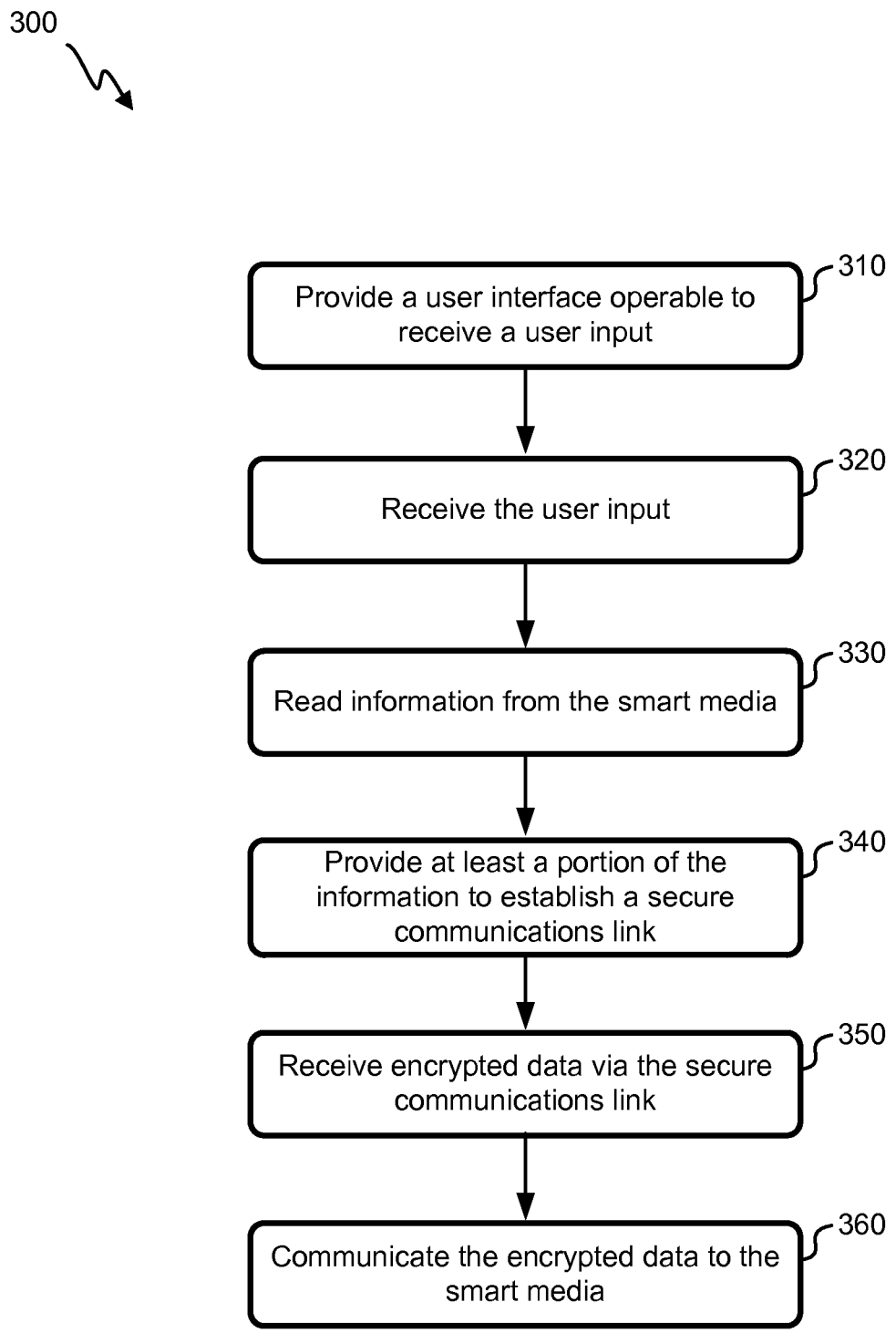
FIG. 3 is a flowchart representing a method for enabling a mobile device to communicate data to be written on a smart media, such as a contactless smart card, according to one embodiment.

FIG. 3 is a flowchart representing a method 300 for enabling a mobile device to communicate data to a smart media, such as a contactless smart card, according to one embodiment. The method, which can be executed by the mobile device, can begin at block 310, where a user interface is provided, where the user interface is operable to receive a user input. As discussed previously, the user interface can include a graphical user interface on a display of the mobile device. User input may be received in any of a variety of ways, depending on desired functionality and hardware capabilities of the device. For example, user input can be received via buttons, a keypad, touchscreen, microphone, camera, motion sensors, and the like.

At block 320, the user input is received. User input can include any of a variety of information, such as login information, payment source information (e.g., credit card information, debit card information, etc.), payment amount information, an indication of a product or service for purchase, and the like. The user input may also indicate and/or depend on a desired point-of-sale transaction the user wishes to make on the mobile device.

At block 330, information is read from the smart media. The information read from the smart media can include a card number, serial number, and/or other identifier, which may be used to help identify the smart media to a central computer. The information read from the smart media may be data that is not encrypted and/or secured, and therefore accessible to the mobile device without the user of encryption keys. The information read from the card may also depend on the input received from the user. For example, an indication that a certain point-of-sale transaction is desired may cause the mobile device to read a serial number from the smart media to provide to a central computer.

At block 340, at least a portion of the information is provided to establish a secure communication link with a remote computer. For example, the mobile device may provide a unique manufacturer serial number or other identifier of the smart media to a remote computer. The remote computer can then use a card database, encryption engine, and/or the like to determine one or more encryption key(s) to use to establish a secure communications link. Other information, such as user login information, mobile device identification information, etc., may also be used to establish the secure communications link.

At block 350, encrypted data is received via the secure communications link. As indicated previously, the mobile device may not decrypt the encrypted data. Instead, at block 360, the encrypted data may be written to the smart media. The mobile device may do so by simply sending the encrypted data to the smart media with no decryption. In so doing, the mobile device may bypass a secure element. Bypassing the secure element may be done by utilizing a specific operating system procedure, which may depend on the mobile device.

Figure 4:
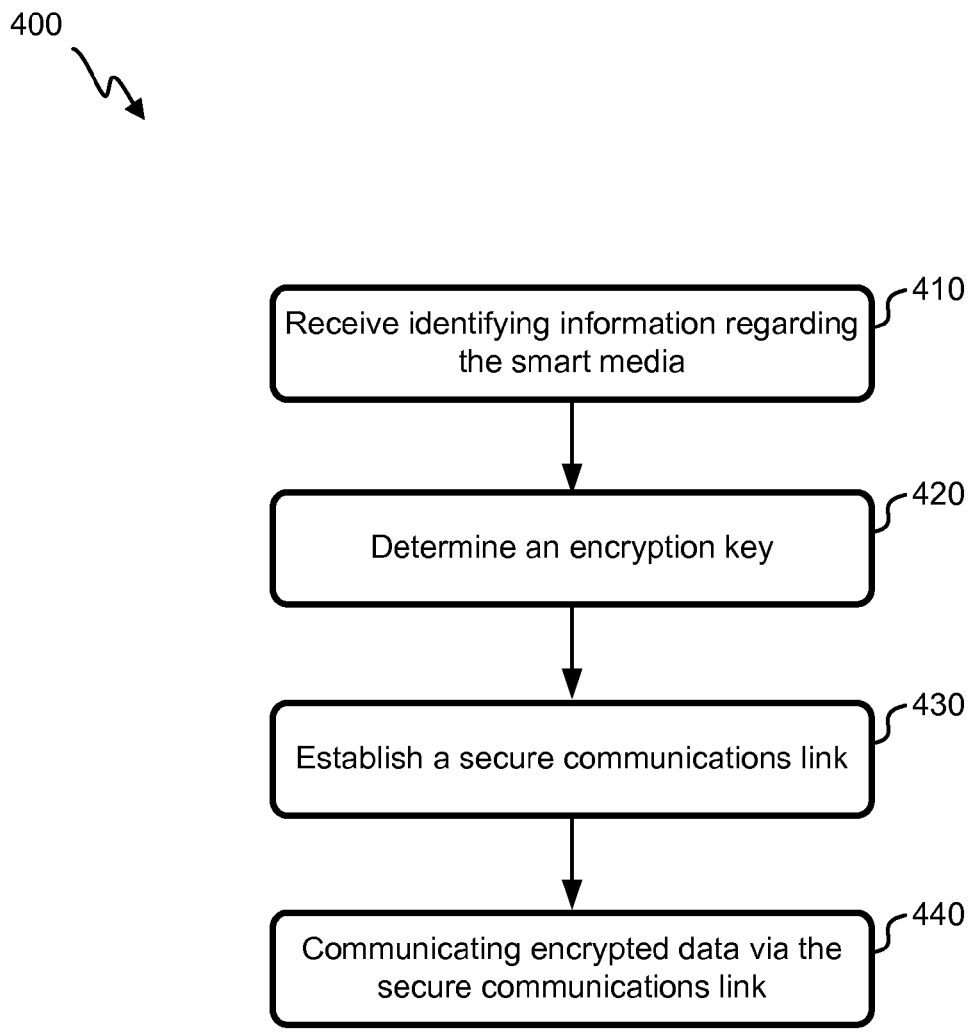
FIG. 4 is a flowchart representing a method for method for enabling a mobile device to communicate with a smart media, which can be performed by a computer, according to one embodiment.

FIG. 4 is a flowchart representing a method 400 for method for enabling a mobile device to communicate with a smart media, which can be performed by a computer of a back-end system (such as the centralized computer host 175 of FIGS. 1A and 1B, and/or the central computer 250 of FIG. 2). The method 400 of FIG. 4 can be performed, for example, by a computer in communication with a mobile device performing the method 300 of FIG. 3.

At block 410, identifying information regarding the smart media is received. The identifying information can include a card number, serial number, and/or other identifier of the smart media. Additionally or alternatively, identifying information can include user identification information, such as a username, password, etc. The information can be verified against data in a database or otherwise stored in a memory, local to or remote from the computer. Other information, such as login information, payment source information, payment amount information, and/or an indication of a product or service to purchase, may also be received.

At block 420, an encryption key is determined. In some embodiments, the encryption key can be determined by utilizing, for example, a lookup table that associates identifying information regarding the smart media with an encryption key. In some embodiments, determining the encryption key may include communicating with an external encryption engine. As indicated previously, a master key and/or multiple encryption keys may be used. The keys can be diversified, based on the serial number of the smart card and the master key.

At block 430, a secure communications link is established. The secure communications link, which can be established between the computer and the mobile device, can be based on at least a portion of information read from the smart media by the mobile device. For example, encryption of the secure communications link can utilize an encryption key associated with an identifier read from the smart media.

At block 440, encrypted data is communicated via the secure communication link. The encrypted data can include any of a variety of data, which can be written to the smart media. For example, the encrypted data can include a value (e.g., a counter, monetary value, credit value, etc.) used to track the smart media's usage in a transit system. Additionally or alternatively, for ticket validation, such encrypted data can include an indication that a ticket related to the smart media has been used and/or is otherwise no longer valid.

It should be appreciated that the specific steps illustrated in FIGS. 3-4 provide example flowcharts illustrating embodiments of methods for enabling a mobile device to communicate with a smart media. Alternative embodiments may include alterations to the embodiments shown. For example, alternative embodiments may include reading and/or writing information to and/or from the smart media at different times. Furthermore, additional features may be added or removed depending on the particular applications. One of ordinary skill in the art would recognize many variations, modifications, and alternatives.

In the foregoing description, for the purposes of illustration, methods were described in a particular order. It should be appreciated that in alternate embodiments, the methods may be performed in a different order than that described. It should also be appreciated that the methods described above may be performed by hardware components and/or may be embodied in sequences of machine-readable instructions, such as programming code, which may be used to cause a machine, such as a general-purpose or special-purpose processor or logic circuits programmed with the instructions to perform the methods. These machine-readable and/or computer-readable instructions may be stored on one or more non-transitory storage mediums, such as CD-ROMs or other type of optical disks, floppy diskettes, ROMs, RAMs, EPROMs, EEPROMs, magnetic or optical cards, flash memory, or other types of machine-readable storage mediums suitable for storing electronic instructions.

With this understanding, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable storage medium, such as those described above. A processor(s) may perform the necessary tasks.

Embodiments provided herein are examples only, and is not intended to limit the scope, applicability, or configuration of the disclosure. Rather, the ensuing description of the embodiments will provide those skilled in the art with an enabling description for implementing one or more embodiments. It should be understood that various changes may be made in the function and arrangement of elements without departing from the spirit and scope of the disclosed systems and methods as set forth in the appended claims.

While illustrative and presently preferred embodiments of the disclosed systems, methods, and devices have been described in detail herein, it is to be understood that the inventive concepts may be otherwise variously embodied and employed, and that the appended claims are intended to be construed to include such variations, except as limited by the prior art.

What is claimed is:

1. A method for enabling an electronic device, capable of communicating with a smart media, to provide a secure link between the smart media and a remote computer, the method comprising:
   providing a user interface with the electronic device, the user interface configured to receive user input;
   receiving, with the electronic device, the user input;
   reading information from the smart media with the electronic device;
   establishing a secure communications link between the electronic device and the remote computer, wherein establishing the secure communications link includes:
      providing at least a portion of the information read from the smart media; and
      in response to providing the information, receiving, with the electronic device, encrypted data from the remote computer via the secure communications link; and
   communicating the encrypted data from the electronic device to the smart media wirelessly, without decrypting the encrypted data with the electronic device, wherein communicating the encrypted data to the smart media includes writing the encrypted data without using a secure element of the electronic device.

2. The method recited in claim 1, wherein communicating the encrypted data from the electronic device to the smart media wirelessly includes communicating with the smart media using Near-Field Communications (NFC).

3. The method recited in claim 1, wherein reading the information from the smart media is based on the user input.

4. The method recited in claim 1, wherein the smart media comprises at least one of:
   a contactless smart card,
   a credit card,
   a debit card, or
   a radio-frequency identification (RFID) tag.

5. The method recited in claim 1, wherein the smart media is physically attached to the electronic device.

6. The method recited in claim 5, wherein the smart media is adhesively coupled with the electronic device.

7. The method recited in claim 1, wherein communicating the encrypted data to the smart media includes changing a value stored in a memory of the smart media.

8. The method recited in claim 7, wherein the value is used to track usage related to a transit system.

9. The method recited in claim 1, wherein providing the at least a portion of the information from the smart media includes providing an identifier of the smart media.

10. The method recited in claim 1, wherein the user input includes at least one of:
    login information,
    payment source information,
    payment amount information, or
    an indication of a product or service for purchase.

11. A non-transitory computer-readable medium having instructions embedded thereon enabling a electronic device, capable of communicating with a smart media, to provide a secure link between the smart media and a remote computer, the instructions including computer-executable code for:
    providing a user interface with the electronic device, the user interface configured to receive user input;
    receiving the user input;
    reading information from the smart media;
    establishing a secure communications link between the electronic device and a remote computer, wherein establishing the secure communications link includes:
       providing at least a portion of the information from the smart media; and
       in response to providing the information, receiving encrypted data from the remote computer; and
    communicating the encrypted data from the electronic device to the smart media wirelessly, without decrypting the encrypted data, wherein communicating the encrypted data to the smart media includes writing the encrypted data without using a secure element of the electronic device.

12. The non-transitory computer-readable medium as recited in claim 11, wherein the smart media comprises at least one of:
- a contactless smart card,
- a credit card,
- a debit card, or
- a radio-frequency identification (RFID) tag.

13. The non-transitory computer-readable medium as recited in claim 11, wherein the computer-executable code for providing the user interface includes computer-executable code for displaying a graphical user interface on a display of the electronic device.

14. The non-transitory computer-readable medium as recited in claim 11, wherein providing the at least a portion of the information from the smart media includes providing an identifier of the smart media.

15. The non-transitory computer-readable medium as recited in claim 11, wherein the computer-executable code for receiving the user input includes computer-executable code for receiving at least one of:
- login information,
- payment source information,
- payment amount information, or
- a product or service for purchase.

* * * * *